United States Patent
Awadalla et al.

(10) Patent No.: US 9,350,457 B2
(45) Date of Patent: May 24, 2016

(54) POWER-EFFICIENT MAXIMUM LIKELIHOOD DECODING FOR 5 BITS PER DUAL-POL-SYMBOL MODULATION

(71) Applicant: Infinera Corp., Sunnyvale, CA (US)

(72) Inventors: Ahmed Awadalla, Gatineau (CA); Han Sun, Ottawa (CA); Kuang-Tsan Wu, Ottawa (CA)

(73) Assignee: Infinera Corporation, Sunnyvale, CA (US)

(*) Notice: Subject to any disclaimer, the term of this patent is extended or adjusted under 35 U.S.C. 154(b) by 27 days.

(21) Appl. No.: 14/145,296

(22) Filed: Dec. 31, 2013

(65) Prior Publication Data

US 2015/0188641 A1    Jul. 2, 2015

(51) Int. Cl.
*H04B 10/61* (2013.01)
*H04L 27/38* (2006.01)
*H04L 1/00* (2006.01)
*H04L 25/06* (2006.01)

(52) U.S. Cl.
CPC .............. *H04B 10/61* (2013.01); *H04B 10/611* (2013.01); *H04B 10/612* (2013.01); *H04L 1/0054* (2013.01); *H04L 25/067* (2013.01); *H04L 27/3818* (2013.01)

(58) Field of Classification Search
CPC .................................................. H04B 10/612
See application file for complete search history.

(56) References Cited

U.S. PATENT DOCUMENTS

| | | | | |
|---|---|---|---|---|
| 2005/0180760 A1* | 8/2005 | Feced et al. | | 398/183 |
| 2005/0271387 A1* | 12/2005 | Kee et al. | | 398/140 |
| 2011/0103795 A1* | 5/2011 | Khandani et al. | | 398/65 |
| 2011/0305457 A1* | 12/2011 | Kikuchi | | 398/65 |
| 2011/0305461 A1* | 12/2011 | Eiselt | | 398/152 |
| 2014/0308039 A1* | 10/2014 | Sun et al. | | 398/79 |

OTHER PUBLICATIONS

Coelho et al., "Global Optimization of Fiber-Optic Communication Systems using Four-Dimensional Modulation Formats", ECOC Technical Digest, 2011, 3 pages.
Karlsson et al., "Which is the Most Power-Efficient Modulation Format in Optical Links?", Optics Express, vol. 17, No. 13, Jun. 22, 2009, 6 pages.
Agrell et al,. "Power-Efficient Modulation Formats in Coherent Transmission Systems", Journal of Lightwave Technology, Apr. 24, 2009, 12 pages.

* cited by examiner

*Primary Examiner* — Nathan Curs
(74) *Attorney, Agent, or Firm* — Harrity & Harrity LLP; David L. Soltz

(57) ABSTRACT

A digital signal processor (DSP), may identify symbol values associated with a 5 quadrature amplitude modulation (5QAM) signal. The DSP may determine a first bit set based on the symbol values and a first particular bit value. The DSP may determine a second bit set based on the symbol values and a second particular bit value. The DSP may compute a first distance based on the first bit set and the symbol values. The DSP may compute a second distance based on the second bit set and the symbol values. The DSP may determine that the first distance is less than the second distance. The first distance being less than the second distance may indicate that the first bit set is a correctly decoded bit set. The DSP may provide an output associated with the correctly decoded bit set.

19 Claims, 8 Drawing Sheets

POWER-EFFICIENT MAXIMUM LIKELIHOOD DECODING FOR 5 BITS PER DUAL-POL-SYMBOL MODULATION

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, each wave (signal) of the Tx PIC may consist of data streams modulated on a phase and/or an amplitude of a laser in order to convey data (via the signal) to the Rx PIC where the signal may be demodulated such that data, included in the signal, may be recovered. A particular modulation format (e.g., phase-shift keying (PSK), quadrature amplitude modulation (QAM) or the like). Different modulation formats correspond to different distances that the signal may be transmitted. Further, different modulation formats may result in different capacities associated with the signal. A particular modulation format may be selected based on a trade-off between capacity and transmission distance.

SUMMARY

According to some possible implementations, a digital signal processor (DSP), included in an optical receiver of an optical system, may be configured to: identify a set of symbol values associated with a 5 quadrature amplitude modulation (5QAM) signal provided by an optical transmitter; determine a first set of bit values based on the set of symbol values and a first particular value for a bit included in the first set of bit values; determine a second set of bit values based on the set of symbol values and a second particular value for a bit included in the second set of bit values, where the second particular value may be different than the first particular value; compute a first distance based on the first set of bit values and the set of symbol values, where the first distance may be a representation of a distance associated with the first set of bit values and the set of symbol values; compute a second distance based on the second set of bit values and the set of symbol values, where the second distance may be a representation of a distance associated with the second set of bit values and the set of symbol values; determine that the first distance is less than the second distance, where the first distance being less than the second distance may indicate that the first set of bit values is a correct set of decoded bit values; and provide an output associated with the correct set of decoded bit values.

According to some possible implementations, a digital signal processor (DSP), included in an optical receiver of an optical system, may be configured to: identify a group of symbol values associated with a 5 quadrature amplitude modulation (5QAM) signal; determine a first set of bit values based on the group of symbol values and a first particular bit value included in the first set of bit values; determine a second set of bit values based on the group of symbol values and a second particular bit value included in the second set of bit values, where the second particular bit value may be different than the first particular bit value; compute a first distance based on the first set of bit values and the group of symbol values, where the first distance may be a representation of a distance metric associated with the first set of bit values and the group of symbol values; compute a second distance based on the second set of bit values and the group of symbol values, where the second distance may be a representation of a distance metric associated with the second set of bit values and the group of symbol values; determine whether the first distance is less than the second distance, where the first distance being less than the second distance may indicate that the first set of bit values is a correct set of decoded bit values; and provide an output associated with the correct set of decoded bit values.

According to some possible implementations, a method may include, identifying, by a DSP, symbol values included in a 5 quadrature amplitude modulation (5QAM) signal; determining, by the DSP, a first bit set based on the symbol values and a first particular bit value included in the first bit set; determining, by the DSP, a second bit set based on the symbol values and a second particular bit value included in the second bit set, where the second particular bit value may be different than the first particular bit value; computing, by the DSP, a first distance based on the first bit set and the symbol values, where the first distance may be a representation of a distance between a first set of possible symbol values and the symbol values, and where the first set of possible symbol values corresponds to the first bit set; computing, by the DSP, a second distance based on the second bit set and the symbol values, where the second distance may be a representation of a distance between a second set of possible symbol values and the symbol values, and where the second set of possible symbol values corresponds to the second bit set; identifying, by the DSP, a minimum distance of the first distance and the second distance, where the minimum distance may indicate that the first bit set or the second bit set, associated with the minimum distance, is a correctly decoded bit set; and providing, by the DSP, an output associated with the correctly decoded bit set.

According to some possible implementations, a digital signal processor (DSP), included in an optical receiver of an optical system, may be configured to: identify a set of symbol values associated with a 5 quadrature amplitude modulation (5QAM) signal; decode the 5QAM signal using a gate count that is less than approximately 10% of a gate count that is required to decode the 5QAM signal using a maximum likelihood decoding technique, where the maximum likelihood decoding technique requires thirty-two distances to be computed based on the set of symbol values; and provide an output associated with the decoded 5QAM signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

In an optical communications system, a dual-pol 5QAM (e.g., a 32-SPQAM format delivering 5 bits per dual-pol-symbol using four dimensions of a fiber channel: in-phase x-pol component (XI), a quadrature x-pol component (XQ), an in-phase y-pol component (YI), and a quadrature y-pol component (YQ)) modulation format may be selected to modulate a signal in order to provide a particular balance between spectral efficiency and transmission distance of the signal.

Maximum likelihood (ML) decoding may be used to decode a 5QAM modulated signal to achieve the expected performance. However, existing ML decoding may require a high gate count (e.g., 5 million gates) when implemented in a coherent modem application specific integrated circuit (ASIC). Implementations described herein may provide a simplified 5QAM modulation decoding method which allows an optical receiver to decode a 5QAM modulated signal using a small portion (e.g., 0.5 million gates, less than approximately 10%, etc.) of the gate count that may be required to decode the 5QAM modulated signal using existing ML decoding (e.g., while maintaining the same level of performance achieved using existing ML decoding).

Figure 1:
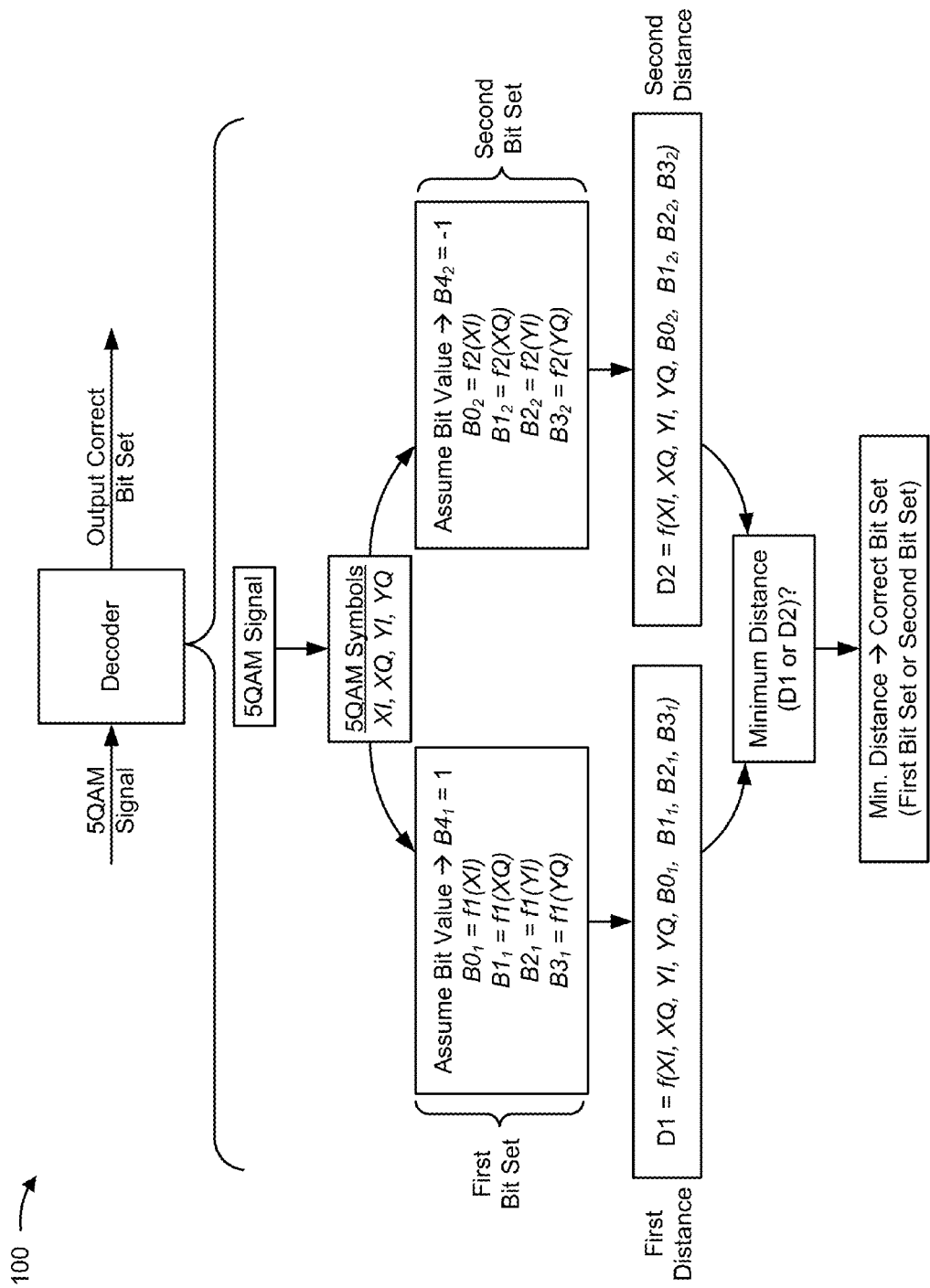
FIG. 1 is a diagram of an overview of an example implementation described herein.

FIG. 1 is a diagram of an overview of an example implementation 100 described herein. For the purposes of FIG. 1, assume that a decoder, associated with an optical receiver, is positioned to receive a 5QAM modulated signal via an optical communications system. Further, assume that the decoder is configured to use a simplified ML decoding method to determine a 5-bit word (e.g., a string of five bits, each bit having one of two possible values, such as 1 or −1), associated with the 5QAM signal, based on symbols included in the 5QAM signal.

As shown in FIG. 1, the decoder may receive the 5QAM signal, and may identify a set of symbol values based on information included in the 5QAM signal (e.g., an XI component, an XQ component, a YI component, and a YQ component). As further shown, the decoder may make a first assumption (e.g., $B4_1=1$) associated with a fifth bit value (e.g., included in a first set of bit values, $B0_1$ through $B4_1$) included in the 5-bit word. As further shown, the decoder may determine other bit values included in the first set of bit values (e.g., $B0_1, B1_1, B2_1, B3_1$) associated with the first assumption based on a set of corresponding functions (e.g., $B0_1=f1(XI)$, $B1_1=f1(XQ)$, $B2_1=f1(YI)$, $B3_1=f1(YQ)$). As shown, the decoder may compute a first distance, D1, associated with the first bit set, based on a function associated with the set of symbols and the first set of bit values (e.g., $D1=f(XI, XQ, YI, YQ, B0_1, B1_1, B2_1, B3_1)$).

As further shown in FIG. 1, the decoder may make a second assumption (e.g., $B4_2=-1$) associated with a fifth bit value (e.g., included in a second set of bit values, $B0_2$ through $B4_2$) included in the 5-bit word. As further shown, the decoder may determine other bit values included in the second set of bit values (e.g., $B0_2, B1_2, B2_2, B3_2$) associated with the second assumption based on a set of corresponding functions (e.g., $B0_2=f2(XI)$, $B1_2=f2(XQ)$, $B2_2=f2(YI)$, $B3_2=f2(YQ)$). As shown, the decoder may compute a second distance, D2, associated with the second bit set, based on a function associated with the set of symbols and the second set of bit values (e.g., $D2=f(XI, XQ, YI, YQ, B0_2, B1_2, B2_2, B3_2)$).

As further shown, the decoder may determine the minimum distance of the two distances (e.g., D1 or D2) computed by the decoder. As shown, the decoder may determine that the bit set associated with the minimum distance (e.g., the first bit set or the second bit set) is a correct bit set (e.g., a bit set that includes the correct decoding of the 5QAM signal), and the decoder may provide output data associated with the correct bit set.

In this way, a decoder may decode a 5QAM modulated signal using a small portion of the gate count that may be required to decode the 5QAM modulated signal using existing ML decoding while providing the same level of performance that may be achieved using existing ML decoding.

Figure 2A:
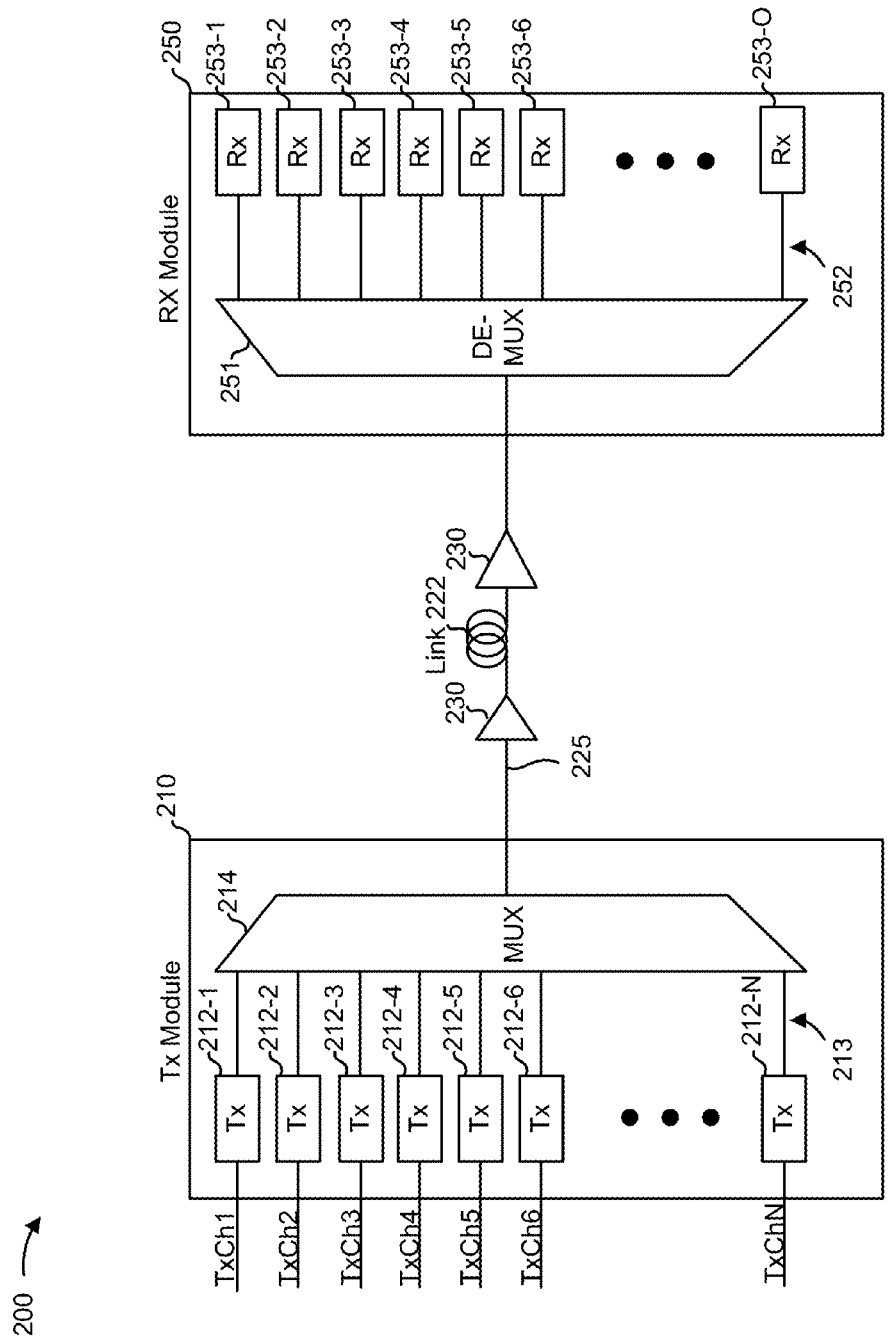
FIG. 2A is a diagram of an example network in which systems and/or methods, described herein, may be implemented.

FIG. 2A is a diagram of an example network 200 in which systems and/or methods described herein may be implemented. As shown in FIG. 2A, network may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N(N>1), waveguides 213, and/or optical multiplexer 214. Each optical transmitter 212 may receive a data channel (TxCh1 through TxChN), modulate the data channel with an optical signal, and transmit the data channel as an optical signal. In some implementations, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP) and/or some other components. The laser, modulator, and/or SOA may be coupled with a tuning element (e.g., a heater) that can be used to tune the wavelength of an optical signal channel output by the laser, modulator, or SOA.

Figure 2B:
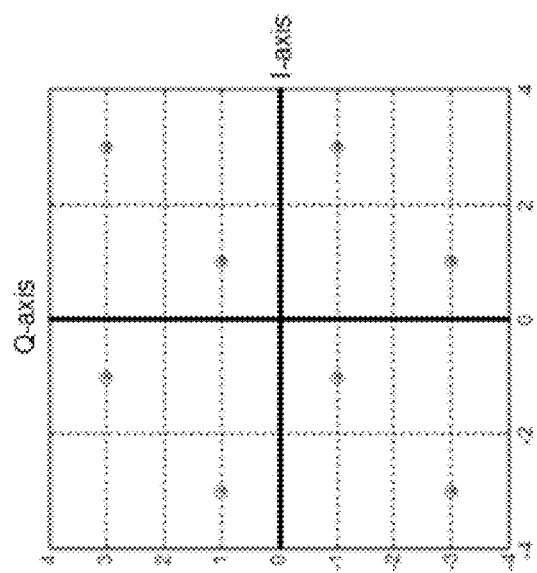
FIG. 2B is an example of a 5QAM constellation diagram for one polarization.

In some implementations, optical transmitter 212 may include a 5QAM symbol mapper (e.g., within the DSP component included in optical transmitter 212). The 5QAM symbol mapper may receive a data source (e.g., a signal received via a Tx channel) and may map bits, associated with the signal, to symbols. In some implementations, the signal may be provided as a dual-pol signal including 5 bits (e.g., using technique serial to parallel converter). In some implementations, the 5 bits may correspond to one of 32 5-bit words (e.g., since (2 values per bit)^(5 bits)=32). Polarization multiplexing is assumed for the transmission of a 5QAM signal. In other words, 5QAM symbol mapper may map the 5-bit word to symbols representative of an x-polarization (e.g., an in-phase x-pol component (XI), a quadrature x-pol component (XQ)), and symbols representative of a y-polarization (e.g., an in-phase y-pol component (YI), a quadrature y-pol component (YQ)). A 5QAM constellation diagram for one polarization (e.g., x-pol or y-pol) may be depicted as shown in FIG. 2B.

In one example implementation, assuming that each bit (e.g., $B_0$, $B_1$, $B_2$, $B_3$, and $B_4$) of the 5 bit word has a value of −1 or 1, the 5QAM symbol mapper may map the 5 bit word to the XI symbol, the XQ symbol, the YI symbol, and the YQ symbol in the following manner:

$$XI=2B_0+B_4 \quad (1)$$

$$XQ=2B_1+B_4 \quad (2)$$

$$YI=2B_2+B_4 \quad (3)$$

$$YQ=2B_3+B_4 \quad (4)$$

As an example, assume that $B_0=-1$, that $B_1=1$, that $B_2=1$, that $B_3=-1$, and that $B_4=-1$, and that $B_0$-$B_4$ represent a five bit word (e.g., 01100 in binary, 12 in decimal). Using the equations described above, the 5QAM symbol mapper may map the five word to an XI symbol of −3 (e.g., 2(−1)+(−1)=−3), an XQ symbol of 1 (e.g., 2(1)+(−1)=1), a YI symbol of 1 (e.g., 2(1)+(−1)=1), and a YQ symbol of −3 (e.g., 2(−1)+(−1)=−3).

In an additional example implementation, the 5QAM symbol mapper may map the 5-bit word to the symbols using a table. An example table that 5QAM symbol mapper may use to map the 5-bit word to the symbols is shown below.

| 5 bit Word | XI | XQ | YI | YQ |
|---|---|---|---|---|
| 0 | −3 | −3 | −3 | −3 |
| 1 | −1 | −1 | −1 | −1 |
| 2 | −3 | −3 | −3 | 1 |
| 3 | −1 | −1 | −1 | 3 |
| 4 | −3 | −3 | 1 | −3 |
| 5 | −1 | −1 | 3 | −1 |
| 6 | −3 | −3 | 1 | 1 |
| 7 | −1 | −1 | 3 | 3 |
| 8 | −3 | 1 | −3 | −3 |
| 9 | −1 | 3 | −1 | −1 |

-continued

| 5 bit Word | XI | XQ | YI | YQ |
|---|---|---|---|---|
| 10 | −3 | 1 | −3 | 1 |
| 11 | −1 | 3 | −1 | 3 |
| 12 | −3 | 1 | 1 | −3 |
| 13 | −1 | 3 | 3 | −1 |
| 14 | −3 | 1 | 1 | 1 |
| 15 | −1 | 3 | 3 | 3 |
| 16 | 1 | −3 | −3 | −3 |
| 17 | 3 | −1 | −1 | −1 |
| 18 | 1 | −3 | −3 | 1 |
| 19 | 3 | −1 | −1 | 3 |
| 20 | 1 | −3 | 1 | −3 |
| 21 | 3 | −1 | 3 | −1 |
| 22 | 1 | −3 | 1 | 1 |
| 23 | 3 | −1 | 3 | 3 |
| 24 | 1 | 1 | −3 | −3 |
| 25 | 3 | 3 | −1 | −1 |
| 26 | 1 | 1 | −3 | 1 |
| 27 | 3 | 3 | −1 | 3 |
| 28 | 1 | 1 | 1 | −3 |
| 29 | 3 | 3 | 3 | −1 |
| 30 | 1 | 1 | 1 | 1 |
| 31 | 3 | 3 | 3 | 3 |

In some implementations, 5QAM symbol mapper may use a different table than the table shown above.

In some implementations, each of the 32 symbols (e.g., XI, XQ, YI, YQ) may be a 4-dimensional (4D) signal. A 5QAM signal may be selected such that a minimum squared Euclidean distance (MSED) among the 32 4D signals is 16, where the squared Euclidean distance between any two signals ($XI_1$, $XQ_1$, $YI_1$, $YQ_1$) and ($XI_2$, $XQ_2$, $YI_2$, $YQ_2$) is $(XI_1-XI_2)^2+(XQ_1-XQ_2)^2+(YI_1-YI_2)^2+(YQ_1-YQ_2)^2$.

Waveguides 213 may include optical links to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2A, receiver module 250 may include optical demultiplexer 251, waveguides 252, and/or optical receivers 253-1 through 253-O (O>1). In some implementations, optical demultiplexer 251 may include an AWG or some other device. Optical demultiplexer 251 may supply multiple signal channels based on a received WDM signal (e.g., optical signal 225). As shown in FIG. 2A, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be made from a birefringent material and/or some other kind of material.

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

The number of devices and networks shown in FIG. 2A is provided for explanatory purposes. In practice, there may be additional devices and/or networks, fewer devices and/or networks, different devices and/or networks, or differently arranged devices and/or networks than those shown in FIG. 2A. Furthermore, two or more of the devices shown in FIG. 2A may be implemented within a single device, or a single device shown in FIG. 2A may be implemented as multiple, distributed devices. Additionally, one or more of the devices of network 200 may perform one or more functions described as being performed by another one or more of the devices of network 200.

Figure 3:
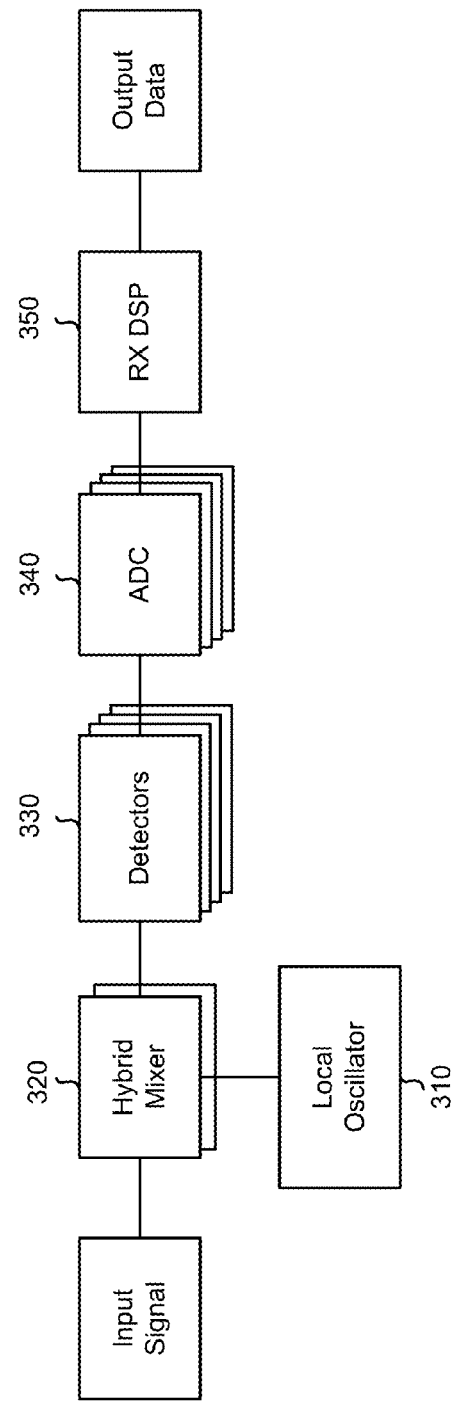
FIG. 3 is a diagram of example components of an optical receiver as shown in FIG. 2A.

FIG. 3 is a diagram of example components of an optical receiver 253 as shown in network 200 of FIG. 2A. As shown in FIG. 3, optical receiver 253 may include local oscillator 310, hybrid mixer 320, detectors 330, analog-to-digital converters (ADCs) 340, and/or RX digital signal processor (DSP) 350. In some implementations, local oscillator 310, hybrid mixer 320, and detectors 330 may be implemented on a single integrated circuit, such as a single PIC. In some implementations, ADC 340 and RX DSP 350 may be implemented using an ASIC. In some other implementations, local oscillator 310, hybrid mixer 320, and/or detectors 330 may be implemented on one or more PICs.

Local oscillator 310 may include a laser device. In some implementations, local oscillator 310 may provide a reference signal to hybrid mixer 320. In some implementations, local oscillator 310 may include a single-sided laser to provide an optical signal to hybrid mixer 320. In some other implementations, local oscillator 310 may include a double-sided laser to provide multiple optical signals to multiple hybrid mixers 320. In some implementations, a phase, intensity, and/or amplitude of the reference signal may be compared to a phase, intensity, and/or amplitude of an input signal (e.g., a WDM signal supplied by optical demultiplexer 251 and corresponding to an output signal provided by transmitter module 212) to recover data carried by the input signal.

Hybrid mixer 320 may include one or more optical devices to receive an input signal (e.g., a WDM signal supplied by optical demultiplexer 251 and corresponding to an output signal provided by transmitter module 212). In some implementations, hybrid mixer 320 may receive a reference signal from local oscillator 310. In some implementations, hybrid mixer 320 may supply components associated with the input signal and the reference optical signal to detectors 330. For example, hybrid mixer 320 may supply an in-phase x-pol component, a quadrature x-pol component, an in-phase y-pol component, and a quadrature y-pol component. In some implementations, a first hybrid mixer 320 may provide the in-phase x-pol component and the quadrature x-pol component, and a second hybrid mixer 320 may provide the in-phase y-pol component and the quadrature y-pol component.

Detector 330 may include one or more photodetectors, such as a photodiode, to receive the output optical signal, from hybrid mixer 320, and convert the output optical signal to corresponding voltage signals. In some implementation, optical receiver 253 may include multiple detectors 330 for in-phase x-pol components, quadrature x-pol components, in-phase y-pol components, and quadrature y-pol components. In some implementations, detectors 330 may include one or more balanced pairs of photodetectors. For example, detectors 330 may include a first pair of photodetectors to receive an in-phase x-pol component, a second pair of photodetectors to receive a quadrature x-pol component. Additionally, detectors 330 may include a third pair of photodetectors to receive an in-phase y-pol component and a fourth pair of photodetectors to receive a quadrature y-pol component.

ADC 340 may include an analog-to-digital converter that converts the voltage signals from detector 330 to digital signals. ADC 340 may provide the digital signals to RX DSP 350. In some implementations, optical receiver 253 may include four ADCs 340 or some other number of ADCs 340 (e.g., one ADC 340 for each electrical signal output by detectors 330).

RX DSP 350 may include a digital signal processing device or a collection of digital signal processing devices. In some implementations, RX DSP 350 may receive digital signals from ADCs 340 and may process the digital signals to form output data associated with the input signal received by hybrid mixer 320. In some implementations, RX DSP 350 may decode the digital signals (e.g., provided in a 5QAM modulation format), and may provide output data based on decoding the digital signals. Additional details regarding RX DSP 350 are described with respect to FIG. 4.

While FIG. 3 shows optical receiver 253 as including a particular quantity and arrangement of components, in some implementations, optical receiver 253 may include additional components, fewer components, different components, or differently arranged components. For example, optical receiver 253 may include a chromatic dispersion compensating component and/or some other component to compensate for dispersion associated with digital signals provided by ADCs 340.

Figure 4:
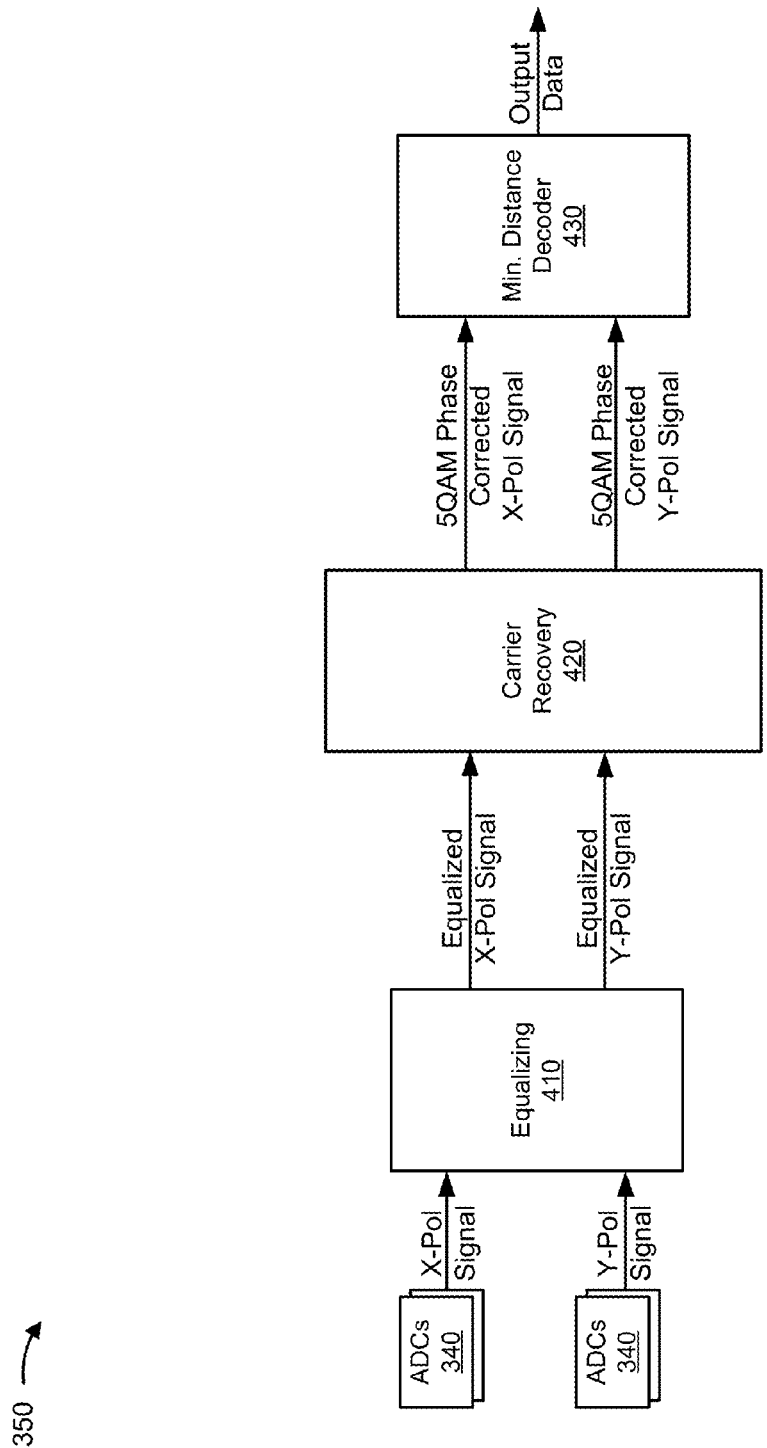
FIG. 4 is a diagram of example components of a receiver digital signal processor as shown in FIG. 3.

FIG. 4 is a diagram of example components of a RX DSP 350 as shown in FIG. 3. As shown in FIG. 4, RX DSP 350 may include equalizing component 410, carrier recovery component 420, and minimum distance decoder 430.

Equalizing component 410 may include equalization algorithms and/or some other components to receive a signal, filter the signal to remove undesired impairments due to channel and/or hardware imperfection, and provide an equalized signal. In some implementations, equalizing component 410 may receive a signal from ADCs 340, may equalize the signal, and may provide the equalized signal to carrier recovery component 420.

Carrier recovery component 420 may receive a signal (e.g., an equalized signal provided by equalizing component 410) and may perform phase correction to remove phase noise from the signal (e.g., phase noise associated with a Tx laser and/or an Rx laser, such as local oscillator 310). In some implementations, carrier recovery component 420 may operate in different modulation modes, such as a 5QAM modulation mode, a 16QAM modulation mode, or some other modulation mode. In some implementations, carrier recovery component 420 may perform differential decoding (e.g., when a sequence, associated with the signal, has been differentially encoded by a component associated with optical transmitter 212).

In some implementations, carrier recovery component 420 may receive an equalized signal from equalizing component 410, may correct a phase associated with the equalized signal, and may output a phase corrected signal (e.g., a 5QAM phase corrected x-pol signal, a 5QAM phase corrected y-pol signal) to minimum distance decoder 430 (e.g., to allow minimum distance decoder 430 to identify bits associated with the phase-corrected signal).

Minimum distance decoder 430 may receive a signal (e.g., a 5QAM phase corrected x-pol signal and/or a 5QAM phase corrected y-pol signal provided by carrier recovery component 420), identify XI, XQ, YI, and YQ symbol values associated with the signal, and identify a corresponding 5-bit word associated with the XI, XQ, YI, and YQ symbol values. For example, minimum distance decoder 430 may perform a function that is inverse to a 5QAM symbol mapper component of optical transmitter 212 (e.g., a component that modulates a signal using the 5QAM modulation format) and may store a table corresponding to the table stored by the 5QAM symbol mapper component of optical transmitter 212.

While FIG. 4 shows RX DSP 350 as including a particular quantity and arrangement of components, in some implementations, RX DSP 350 may include additional components, fewer components, different components, or differently arranged components.

Figure 5:
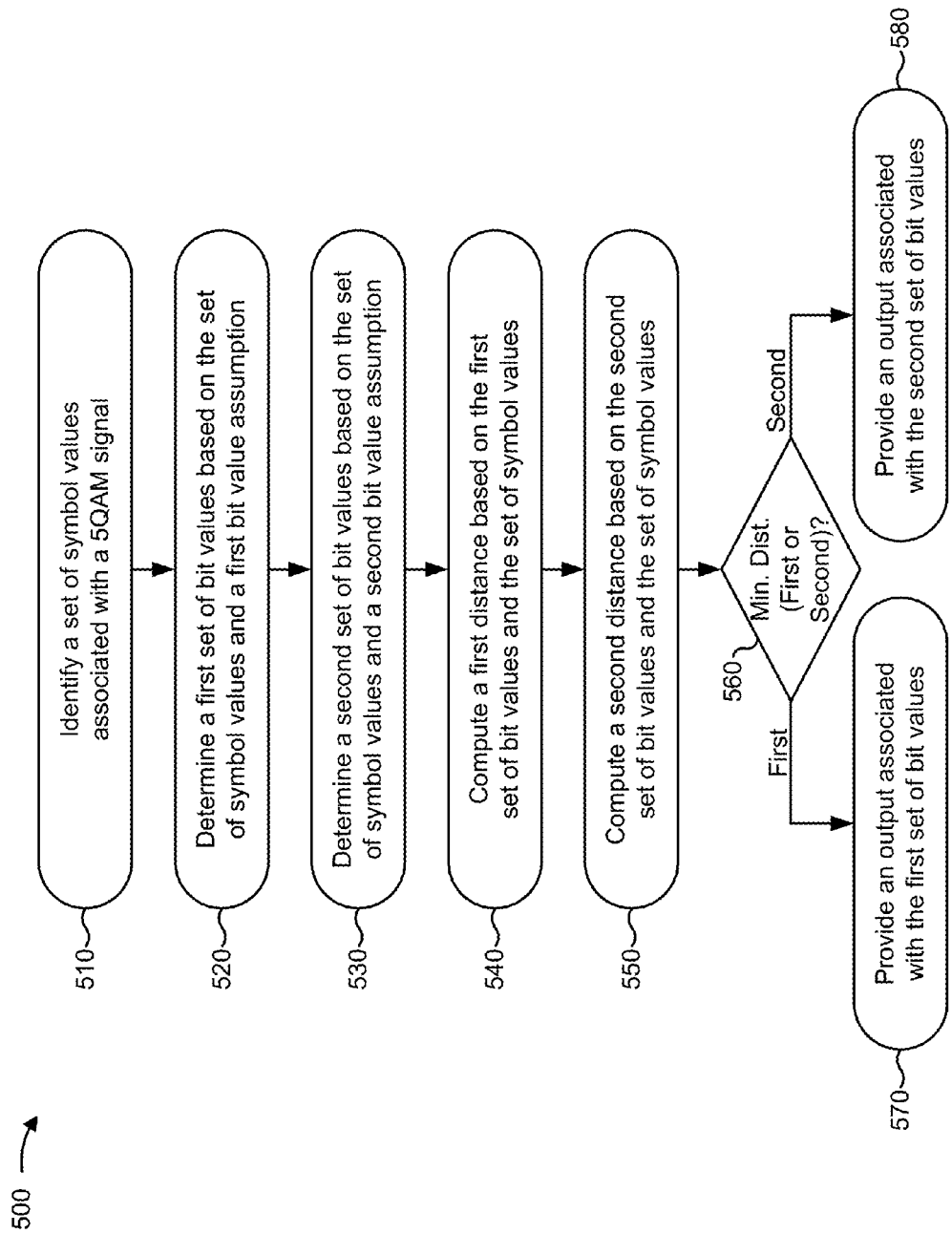
FIG. 5 is a flow chart of an example process for providing an output associated with a set of bit values determined based on a 5QAM signal.

FIG. 5 is a flow chart of an example process 500 for providing an output associated with a set of bit values determined based on a 5QAM signal. In some implementations, one or more process blocks of FIG. 5 may be performed by minimum distance decoder 430 (decoder 430). In some implementations, one or more process blocks of FIG. 5 may be performed by another component or a group of components separate from or including decoder 430, such as another component of RX DSP 350.

As shown in FIG. 5, process 500 may include identifying a set of symbol values associated with a 5QAM signal (block 510). For example, decoder 430 may identify a set of symbol values associated with a 5QAM signal. In some implementations, decoder 430 may identify the set of symbol values associated with the 5QAM signal when decoder 430 receives the 5QAM signal from carrier recovery component 420. Additionally, or alternatively, decoder 430 may identify the symbol values when decoder 430 receives information, indicating that decoder 430 is to identify the symbol values, from another component (e.g., another component of RX DSP 350).

In some implementations, the set of symbol values may include symbol values provided by a 5QAM symbol mapper component (e.g., included in a optical transmitter 212) that maps a 5-bit word (e.g., associated with a signal) to a set of symbol values representative of an in-phase x-pol component (XI), a quadrature x-pol component (XQ), an in-phase y-pol component (YI), and a quadrature y-pol component (YQ). In some implementations, the symbol values may be a positive numerical value or a negative numerical value (e.g., 3, −1, etc.)

In some implementations, decoder 430 may identify the symbol values based on information included in the 5QAM signal. For example, the 5QAM signal (e.g., provided by optical transmitter 212 and received by optical receiver 253, etc.) may include information that identifies the set of symbol values, and decoder 430 may identify the set of symbol values based on the information included in the 5QAM signal.

As further shown in FIG. 5, process 500 may include determining a first set of bit values based on the set of symbol values and a first bit value assumption (block 520). For example, decoder 430 may determine a first set of bit values based on the set of symbol values and a first bit value assumption. In some implementations, decoder 430 may determine the first set of bit values when decoder 430 identifies the set of symbol values associated with the 5QAM signal. Additionally, or alternatively, decoder 430 may determine the first set of bit values when decoder 430 receives information, indicating that decoder 430 is to determine the first set of bit values, from another component (e.g., another component of RX DSP 350).

A first set of bit values may include a set of bit values, determined by decoder 430, that identify a first possible 5-bit word associated with a 5QAM signal. In some implementations, the first set of bit values may include five bit values, where each bit value may have one of two possible values (e.g., 1 or −1). In some implementations, the first set of bit values may correspond to a 5-bit word. For example, a first set of bit values including 1, −1, 1, 1, −1 may correspond to a 5-bit word, 10110, that identifies a decimal value of 22.

A first bit value assumption may include an assumed value of a bit, included in the first set of bit values, that may allow decoder 430 to determine other bit values (e.g., four other bit values) included in the first set of bit values based on the set of symbol values and a decoding technique (e.g., an existing quadrature phase-shift keying (QPSK) decision technique). In some implementations, the first bit value assumption may be associated with a particular bit (e.g., a fifth bit) included in the first set of bit values.

In some implementations, decoder 430 may determine the first set of bit values based on the first bit value assumption, the set of symbols, and a decoding technique. For example, decoder 430 may assume that a fifth bit value (e.g., $B4_1$), of a first set of five bit values (e.g., $B0_1$, $B1_1$, $B2_1$, $B3_1$, $B4_1$) is 1, and decoder 430 may determine the other four bit values (e.g., $B0_1$, $B1_1$, $B2_1$, $B3_1$), of the first set of five bit values based on the set of symbol values (e.g., an XI value, an XQ value, a YI value, a YQ value), and a QPSK decision decoding technique. In one example implementation, decoder 430 may assume that a fifth bit value is 1 (e.g., $B4_1=1$), and decoder 430 may determine the other four bit values, included in the first set of bit values, in the following manner:

---
(1) If (XI-1) > 0, $B0_1 = 1$, else $B0_1 = -1$
(2) If (XQ-1) > 0, $B1_1 = 1$, else $B1_1 = -1$
(3) If (YI-1) > 0, $B2_1 = 1$, else $B2_1 = -1$
(4) If (YQ-1) > 0, $B3_1 = 1$, else $B3_1 = -1$.
---

In another example implementation, decoder 430 may determine the first set of bit values using some other function, such as a function that determines each bit value, included in the first set of bit values, based on the set of symbol values.

As further shown in FIG. 5, process 500 may include determining a second set of bit values based on the set of symbol values and a second bit value assumption (block 530). For example, decoder 430 may determine a second set of bit values based on the set of symbol values and a second bit value assumption. In some implementations, decoder 430 may determine the second set of bit values when decoder 430 identifies the set of symbol values associated with the 5QAM signal. Additionally, or alternatively, decoder 430 may determine the second set of bit values when decoder 430 determines the first set of bit values (e.g., after decoder 430 determines the first set of bit values). Additionally, or alternatively, decoder 430 may determine the second set of bit values when decoder 430 receives information, indicating that decoder 430 is to determine the second set of bit values, from another component (e.g., another component of RX DSP 350).

A second set of bit values may include a set of bit values, determined by decoder 430, that identify a second possible 5-bit word associated with a 5QAM signal. In some implementations, the second set of bit values may include five bit values, where each bit value may have one of two possible values (e.g., 1 or −1). In some implementations, the second set of bit values may correspond to a 5-bit word. For example, a second set of bit values including 1, 1, −1, −1, 1 may correspond to a 5-bit word, 11001, that identifies a decimal value of 25.

A second bit value assumption may include an assumed value of a bit, included in the second set of bit values, that may allow decoder 430 to determine other bit values (e.g., four other bit values) included in the second set of bit values based on the set of symbol values and a decoding technique (e.g., an existing quadrature phase-shift keying (QPSK) decision technique). In some implementations, the second bit value assumption may be associated with a particular bit (e.g., a fifth bit) included in the second set of bit values.

In some implementations, decoder 430 may determine the second set of bit values based on the second bit value assumption, the set of symbols, and a decoding technique. For example, decoder 430 may assume that a fifth bit value (e.g., $B4_2$), of a second set of five bit values (e.g., $B0_2$, $B1_2$, $B2_2$, $B3_2$, $B4_2$) is −1, and decoder 430 may determine the other four bit values (e.g., $B0_2$, $B1_2$, $B2_2$, $B3_2$), of the second set of five bit values based on the set of symbol values (e.g., the XI value, the XQ value, the YI value, the YQ value), and a QPSK decision decoding technique. In one example implementation, decoder 430 may assume that a fifth bit value is −1 (e.g., $B4_2=-1$), and decoder 430 may determine the other four bit values, included in the second set of bit values, in the following manner:

(1) If $(XI + 1) > 0$, $B0_2 = 1$, else $B0_2 = -1$
(2) If $(XQ + 1) > 0$, $B1_2 = 1$, else $B1_2 = -1$
(3) If $(YI + 1) > 0$, $B2_2 = 1$, else $B2_2 = -1$
(4) If $(YQ + 1) > 0$, $B3_2 = 1$, else $B3_2 = -1$.

In another example implementation, decoder 430 may determine the second set of bit values using some other function, such as a function that determines each bit value, included in the second set of bit values, based on the set of symbol values.

As further shown in FIG. 5, process 500 may include computing a first distance based on the first set of bit values and the set of symbol values (block 540). For example, decoder 430 may compute a first distance based on the first set of bit values and the set of symbol values determined by decoder 430. In some implementations, decoder 430 may compute the first distance when decoder 430 determines the first set of bit values (e.g., after decoder 430 determines the first set of bit values). Additionally, or alternatively, decoder 430 may compute the first distance when decoder 430 receives information, indicating that decoder 430 is to compute the first distance, from another component (e.g., another component of RX DSP 350).

In some implementations, a first distance may include a Euclidean distance associated with the set of symbol values (e.g., the XI value, the XQ value, the YI value, the YQ value) and the first set of bit values (e.g., $B0_1$, $B1_1$, $B2_1$, $B3_1$, $B4_1$). Alternatively, the first distance may include another type of distance metric, such as a sum of an absolute distance associated with the set of symbol values. In some implementations, the first distance may be a representation of a distance measurement between a point on a constellation diagram (e.g., similar to FIG. 2B), associated with the set of symbol values, and a point on the constellation diagram associated with the first set of bit values. For example, the first set of bit values may correspond to a first set of possible symbol values (e.g., when the first set of bit values is converted to an XI value, a XQ value, a YI value, and a YQ value), and the distance may represent a distance measurement between the set of symbol values and the first set of possible symbol values. In some implementations, the first distance may be used (e.g., based on a comparison with a second distance, as discussed below) to determine if the first set of bit values is a correctly decoded set of bit values (e.g., if the first set of bit values correctly identifies the information included in the 5QAM modulated signal). In one example implementation, decoder 430 may determine the first distance in the following manner:

$$D1=|(X1-1)-(2\times B0_1)|^2+|(XQ-1)-(2\times B1_1)|^2+|(YI-1)-(2\times B2_1)|^2+|(YQ-1)-(2\times B3_1)|^2$$

In another example implementation, decoder 430 may determine the first distance using some other function, such as a function that determines the first distance based on the set of symbol values and the first set of bit values.

As further shown in FIG. 5, process 500 may include computing a second distance based on the second set of bit values and the set of symbol values (block 550). For example, decoder 430 may compute a second distance based on the second set of bit values and the set of symbol values determined by decoder 430. In some implementations, decoder 430 may compute the second distance when decoder 430 determines the second set of bit values (e.g., after decoder 430 determines the second set of bit values). Additionally, or alternatively, decoder 430 may compute the second distance when decoder 430 receives information, indicating that decoder 430 is to compute the second distance, from another component (e.g., another component of RX DSP 350).

In some implementations, a second distance may include a Euclidean distance associated with the set of symbol values (e.g., the XI value, the XQ value, the YI value, the YQ value) and the second set of bit values (e.g., $B0_2$, $B1_2$, $B2_2$, $B3_2$, $B4_2$). Alternatively, the second distance may include another type of distance metric, such as a sum of an absolute distance associated with the set of symbol values. In some implementations, the second distance may be a representation of a distance measurement between a point on a constellation diagram (e.g., similar to FIG. 2B), associated with the set of symbol values, and a point on the constellation diagram associated with the second set of bit values. For example, the second set of bit values may correspond to a second set of possible symbol values (e.g., when the second set of bit values is converted to an XI value, a XQ value, a YI value, and a YQ value), and the distance may represent a distance measurement between the set of symbol values and the second set of possible symbol values. In some implementations, the second distance may be used (e.g., based on a comparison with the first distance, as discussed below) to determine if the second set of bit values is a correctly decoded set of bit values (e.g., to determine if the second set of bit values correctly identifies the information included in the 5QAM modulated signal). In one example implementation, decoder 430 may determine the second distance in the following manner:

$$D2=|(X1+1)-(2\times B0_2)|^2+|(XQ+1)-(2\times B1_2)|^2+|(YI+1)-(2\times B^2_2)|^2+|(YQ+1)-(2\times B3_2)|^2$$

In another example implementation, decoder 430 may determine the second distance using some other function, such as a function that determines the second distance based on the set of symbol values and the second set of bit values.

As further shown in FIG. 5, process 500 may include determining a minimum distance based on the first distance and the second distance (block 560). For example, decoder 430 may determine a minimum distance based on the first distance and the second distance determined by decoder 430. In some implementations, decoder 430 may determine the minimum distance when decoder 430 determines the first distance and the second distance (e.g., after decoder 430 determines the first distance and the second distance). Additionally, or alternatively, decoder 430 may determine the minimum distance when decoder 430 receives information, indicating that decoder 430 is to determine the minimum distance, from another component (e.g., another component of RX DSP 350).

In some implementations, decoder 430 may determine the minimum distance based on the first distance and the second distance. For example, decoder 430 may determine a first distance (e.g., a first numerical distance value) and a second distance (e.g., a second numerical distance value), and decoder 430 may determine the minimum distance based on comparing the first distance and the second distance (e.g., the first distance is the minimum distance when the first numerical distance value is less than the second numerical distance value, or the second distance is the minimum distance when the second numerical distance value is less than the first numerical distance value). In some implementations, the set of bit values associated with the minimum distance (e.g., the set of bit values used to compute the minimum distance) may identify a correct set of bit values (e.g., a set of bit values that includes decoded bits that correctly identify the information included in the 5QAM signal).

As further shown in FIG. 5, if the minimum distance is the first distance (block 560—FIRST), then process 500 may include providing an output associated with the first set of bit values (block 570). For example, decoder 430 may determine that the first distance is the minimum distance, and decoder 430 may provide an output associated with the first set of bit values. In some implementations, decoder 430 may provide the output, associated with the first set of bit values, when decoder 430 determines that the first distance is the minimum distance (e.g., after decoder 430 compares the first distance and the second distance). Additionally, or alternatively, decoder 430 may provide the output, associated with the first set of bit values, when decoder 430 receives information, indicating that decoder 430 is to provide the output, from another component (e.g., another component of RX DSP 350).

In some implementations, the output, associated with the first set of bit values, may include information that identifies each bit included in the first set of bit values. For example, decoder 430 may determine that the first distance is the minimum distance, and decoder 430 may provide an output that includes the first set of bit values (e.g., a set of 5 bit values included in the first set of bit values). Additionally, or alternatively, decoder 430 may provide an output that includes information associated with the first set of bit values (e.g., a 5-bit word identified by the first set of bit values). Additionally, or alternatively, the output may include decoded information that matches original information modulated by optical transmitter 212 (e.g., the output may reflect the original information received by optical transmitter 212).

In some implementations, decoder 430 may provide the output to another component (e.g., another component of RX DSP 350, another component of optical receiver 253) and/or another device (e.g., another device included in network 200).

As further shown in FIG. 5, if the minimum distance is the second distance (block 560—SECOND), then process 500 may include providing an output associated with the second set of bit values (block 580). For example, decoder 430 may determine that the second distance is the minimum distance, and decoder 430 may provide an output associated with the second set of bit values. In some implementations, decoder 430 may provide the output, associated with the second set of bit values, when decoder 430 determines that the second distance is the minimum distance (e.g., after decoder 430 compares the first distance and the second distance). Additionally, or alternatively, decoder 430 may provide the output, associated with the second set of bit values, when decoder 430 receives information, indicating that decoder 430 is to provide the output, from another component (e.g., another component of RX DSP 350).

In some implementations, the output, associated with the second set of bit values, may include information that identifies each bit value included in the second set of bit values. For example, decoder 430 may determine that the second distance is the minimum distance, and decoder 430 may provide an output that includes the second set of bit values (e.g., a set of 5 bit values included in the second set of bit values). Additionally, or alternatively, decoder 430 may provide an output that includes information associated with the second set of bit values (e.g., a 5-bit word identified by the second set of bit values). Additionally, or alternatively, the output may include decoded information that matches original information modulated by optical transmitter 212 (e.g., the output may reflect the original information received by optical transmitter 212).

In some implementations, decoder 430 may provide the output to another component (e.g., another component of RX DSP 350, another component of optical receiver 253) and/or another device (e.g., another device included in network 200).

In this manner, decoder 430 must compute only two distances in order to correctly decode the 5QAM signal (e.g., as described above). By comparison, the existing ML decoding method requires 32 Euclidean distances to be computed (e.g., since there are 32 possible five bit words, as shown in the table above) based on the received XI, XQ, YI, and YQ symbols, and the minimum Euclidean distance of the 32 Euclidean distances correctly identifies the correctly decoded 5 bit word. In this way, the 5QAM signal may be decoded using a small portion (e.g., less than approximately 10%) of the gate count that may be required to decode the 5QAM modulated signal using the existing ML decoding method. For example, decoder 430 may decode the 5QAM signal using 0.5 million gates in a manner described herein, where decoder 430 may require 5 million gates to decode the 5QAM signal using the existing ML decoding method.

Although FIG. 5 shows example blocks of process 500, in some implementations, process 500 may include additional blocks, different blocks, fewer blocks, or differently arranged blocks than those depicted in FIG. 5. Additionally, or alternatively, one or more of the blocks of process 500 may be performed in parallel.

Figure 6A:
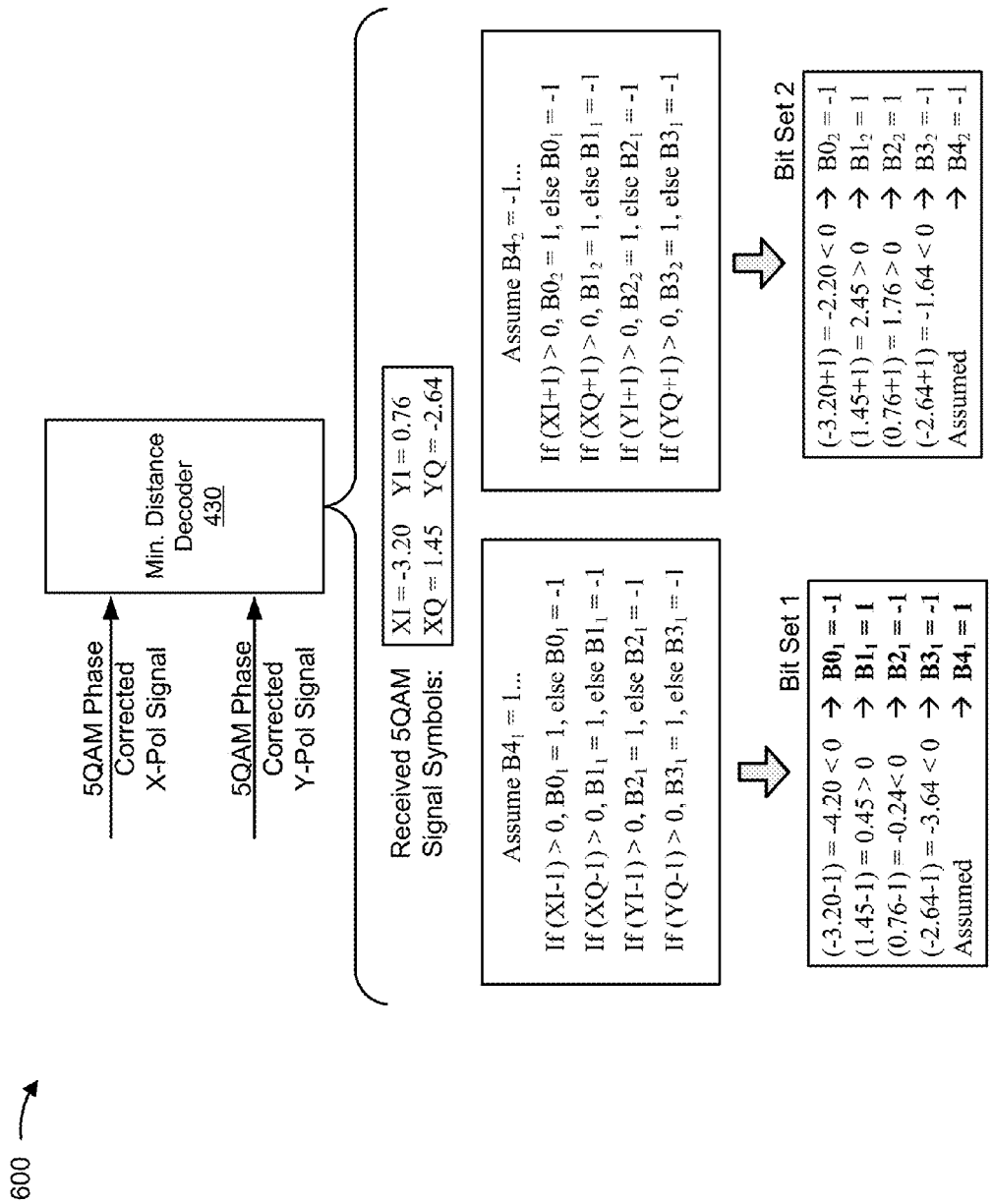
FIGS. 6A and 6B are diagrams of an example implementation relating to the example process shown in FIG. 5.
Figure 6B:
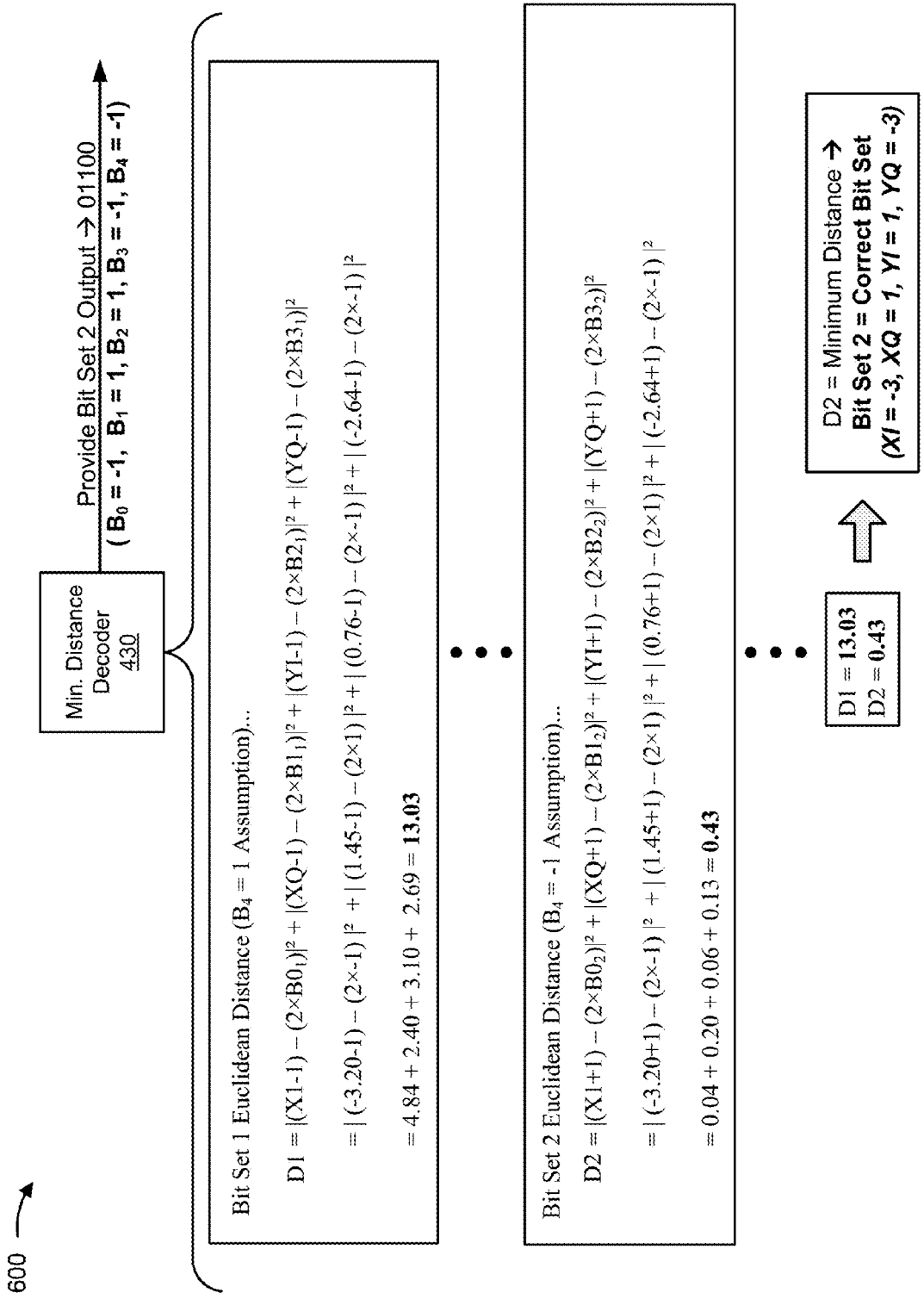

FIGS. 6A and 6B are diagrams of an example implementation 600 relating to example process 500 shown in FIG. 5. For the purposes of example implementation 600, assume that decoder 430 is positioned to receive a 5QAM phase corrected x-pol signal and a 5QAM phase corrected y-pol signal via an optical communications system. Further, assume that decoder 430 is configured to decode the 5QAM signals based on assuming a bit value included in each of two possible sets of bit values, determining two possible sets of bit values, and computing a minimum distance associated with the sets of bit values, as discussed above.

As shown in FIG. 6A, decoder 430 may receive a 5QAM phase corrected x-pol signal and a 5QAM phase corrected y-pol signal, and decoder 430 may identify a set of received symbol values based on the signals. As shown, assume that decoder 430 identifies an XI value as −3.20, an XQ value as 1.45, a YI value as 0.76, and a YQ as −2.64.

As further shown, decoder 430 may determine a first set of bit values based on a first bit value assumption. As shown, decoder 430 may assume that fifth bit of the first set of bit values (e.g., $B4_1$) has a value of 1. As further shown, decoder 430 may determine other bit values of the first set of bit values (e.g., $B0_1$ through $B3_1$). As shown, decoder 430 may determine that $B0_1$ has a value of −1 (e.g., since −3.20−1=−4.20 is not greater than 0), that $B1_1$ has a value of 1 (e.g., since 1.45−1=0.45 is greater than 0), that $B2_1$ has a value of −1 (e.g., since 0.76−1=−0.24 is not greater than 0), and that $B3_1$ has a value of −1 (e.g., since −2.64−1=−3.64 is not greater than 0).

As further shown in FIG. 6A, decoder 430 may determine a second set of bit values based on a second bit value assumption. As shown, decoder 430 may assume that fifth bit of the second set of bit values (e.g., $B4_2$) has a value of −1. As further shown, decoder 430 may determine other bit values of the second set of bit values (e.g., $B0_2$ through $B3_2$). As shown, decoder 430 may determine that $B0_2$ has a value of −1 (e.g., since −3.20+1=−2.20 is not greater than 0), that $B1_2$ has a value of 1 (e.g., since 1.45+1=2.45 is greater than 0), that $B2_2$ has a value of 1 (e.g., since 0.76+1=1.76 is greater than 0), and that $B3_2$ has a value of −1 (e.g., since −2.64+1=−1.64 is not greater than 0).

As shown in FIG. 6B, decoder 430 may compute a first squared Euclidean distance based on the first set of bit values and the set of symbol values. As shown, decoder 430 may compute the first Euclidean distance, D1, as having a value of 13.03 (e.g., $D1=|(-3.20-1)-(2\times-1)|^2+|(1.45-1)-(2\times1)|^2+|(0.76-1)-(2\times-1)|^2+|(-2.64-1)-(2\times-1)|^2=4.84+2.40+3.10+2.69=13.03$). As further shown, decoder 430 may compute a second squared Euclidean distance based on the second set of bit values and the set of symbol values. As shown, decoder 430 may compute the second Euclidean distance, D2, as having a value of 0.43 (e.g., $D2=|(-3.20+1)-(2\times-1)|^2+|(1.45+1)-(2\times1)|^2+|(0.76+1)-(2\times1)|^2+|(-2.64+1)-(2\times-1)|^2=0.04+0.20+0.06+0.13=0.43$).

As further shown, decoder 430 may determine the minimum distance by comparing D1 and D2, and may determine that D2 is the minimum distance (e.g., since 0.43 is less than 13.03). As such, decoder 430 may determine that the actual set of symbol values (e.g., provided by optical transmitter 212) is XI=−3, XQ=1, YI=1, YQ=−3, and decoder 430 may identify the second set of bit values as the correct bit set (e.g., since the second set of bit values is associated with D2), and decoder 430 may provide an output associated with the second set of bit values (e.g., an output that identifies a 5-bit word 01100 associated with the second set of bit values, −1, 1, 1, −1, −1, where −1 corresponds to a binary value of 0).

Notably, using existing ML decoding, decoder 430 would be required to calculate 32 Euclidean distances before determining the actual set of symbol values (e.g., XI=−3, XQ=1, YI=1, YQ=−3). However, using the decoding method described above, decoder 430 is only required to calculate two Euclidean distances before determining the actual set of symbol values. In this way, decoder 430 may decode a 5QAM signal by computing only two distances (e.g., rather than computing 32 distances as required by existing ML decoding of a 5QAM signal).

As indicated above, FIGS. 6A and 6B are provided merely as an example. Other examples are possible and may differ from what was described with regard to FIGS. 6A and 6B.

Implementations described herein may provide a simplified 5QAM modulation decoding method which decodes a 5QAM modulated signal using a small portion (e.g., less an approximately 5%, 10%, 20%, etc.) of the gate count that may be required to decode the 5QAM modulated signal using existing ML decoding (e.g., while maintaining the same level of performance achieved using existing ML decoding)

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system comprising:
   an optical receiver comprising:
      a digital signal processor (DSP) configured to:
         identify a set of symbol values associated with a 5 quadrature amplitude modulation (5QAM) signal provided by an optical transmitter;
         determine a first set of bit values based on the set of symbol values and a first particular value for a bit included in the first set of bit values;
         determine a second set of bit values based on the set of symbol values and a second particular value for a bit included in the second set of bit values,
            the second particular value being different than the first particular value;
         compute a first distance based on the first set of bit values and the set of symbol values,
            the first distance being a representation of a distance associated with the first set of bit values and the set of symbol values;
         compute a second distance based on the second set of bit values and the set of symbol values,
            the second distance being a representation of a distance associated with the second set of bit values and the set of symbol values;
         determine that the first distance is less than the second distance,
            the first distance being less than the second distance indicating that the first set of bit values is a correct set of decoded bit values; and
         provide an output associated with the correct set of decoded bit values.

2. The optical system of claim 1, where the DSP is further configured to:
   identify an in-phase x-pol component of the 5QAM signal;
   identify a quadrature x-pol component of the 5QAM signal;
   identify an in-phase y-pol component of the 5QAM signal;
   identify a quadrature y-pol component of the 5QAM signal; and
   where the DSP, when identifying the set of symbol values, is further configured to:

identify the set of symbol values based on the in-phase x-pol component, the quadrature x-pol component, the in-phase y-pol component, and the quadrature y-pol component.

3. The optical system of claim 1, where the DSP is further configured to:
   identify an in-phase x-pol component of the 5QAM signal;
   identify a quadrature x-pol component of the 5QAM signal;
   identify an in-phase y-pol component of the 5QAM signal;
   identify a quadrature y-pol component of the 5QAM signal;
   determine a fifth bit value, included in the first set of bit values, based on the first particular value;
   determine a first bit value, included in the first set of bit values, based on subtracting a value from the in-phase x-pol component included in the set of symbol values;
   determine a second bit value, included in the first set of bit values, based on subtracting the value from the quadrature x-pol component included in the set of symbol values;
   determine a third bit value, included in the first set of bit values, based on subtracting the value from the in-phase y-pol component included in the set of symbol values;
   determine a fourth bit value, included in the first set of bit values, based on subtracting the value from the quadrature y-pol component included in the set of symbol values; and
   where the DSP, when determining the first set of bit values, is further configured to:
      determine the first set of bit values based on the first bit value, the second bit value, the third bit value, the fourth bit value, and the fifth bit value.

4. The optical system of claim 1, where the DSP is further configured to:
   identify an in-phase x-pol component of the 5QAM signal;
   identify a quadrature x-pol component of the 5QAM signal;
   identify an in-phase y-pol component of the 5QAM signal;
   identify a quadrature y-pol component of the 5QAM signal;
   determine a fifth bit value, included in the second set of bit values, based on the second particular value;
   determine a first bit value, included in the second set of bit values, based on adding a value to the in-phase x-pol component included in the set of symbol values;
   determine a second bit value, included in the second set of bit values, based on adding the value to the quadrature x-pol component included in the set of symbol values;
   determine a third bit value, included in the second set of bit values, based on adding the value to the in-phase y-pol component included in the set of symbol values;
   determine a fourth bit value, included in the second set of bit values, based on adding the value to the quadrature y-pol component included in the set of symbol values; and
   where the DSP, when determining the second set of bit values, is further configured to:
      determine the second set of bit values based on the first bit value, the second bit value, the third bit value, the fourth bit value, and the fifth bit value.

5. The optical system of claim 1, where the DSP, when computing the first distance, is further configured to:
   determine a first Euclidean distance based on the set of symbol values and the first set of bit values; and
   where the DSP, when computing the second distance, is further configured to:
      determine a second Euclidean distance based on the set of symbol values and the second set of bit values.

6. The optical system of claim 1, where the DSP is further configured to:
   determine a 5-bit word associated with the correct set of decoded bit values; and
   where the DSP, when providing the output associated with the correct set of decoded bit values, is further configured to:
      provide the 5-bit word.

7. An optical system comprising:
   an optical receiver comprising:
      a digital signal processor (DSP) configured to:
         identify a group of symbol values associated with a 5 quadrature amplitude modulation (5QAM) signal;
         determine a first set of bit values based on the group of symbol values and a first particular bit value included in the first set of bit values;
         determine a second set of bit values based on the group of symbol values and a second particular bit value included in the second set of bit values,
            the second particular bit value being different than the first particular bit value;
         compute a first distance based on the first set of bit values and the group of symbol values,
            the first distance being a representation of a distance metric associated with the first set of bit values and the group of symbol values;
         compute a second distance based on the second set of bit values and the group of symbol values,
            the second distance being a representation of a distance metric associated with the second set of bit values and the group of symbol values;
         determine whether the first distance is less than the second distance,
            the first distance being less than the second distance indicating that the first set of bit values is a correct set of decoded bit values; and
         provide an output associated with the correct set of decoded bit values.

8. The optical system of claim 7, where the DSP is further configured to:
   identify an in-phase x-pol component of the 5QAM signal;
   identify a quadrature x-pol component of the 5QAM signal;
   identify an in-phase y-pol component of the 5QAM signal;
   identify a quadrature y-pol component of the 5QAM signal; and
   where the DSP, when identifying the group of symbol values, is further configured to:
      identify the group of symbol values based on the in-phase x-pol component, the quadrature x-pol component, the in-phase y-pol component, and the quadrature y-pol component.

9. The optical system of claim 7, where the DSP is further configured to:
   identify an in-phase x-pol component of the 5QAM signal;
   identify a quadrature x-pol component of the 5QAM signal;
   identify an in-phase y-pol component of the 5QAM signal;
   identify a quadrature y-pol component of the 5QAM signal;
   determine a fifth bit value, included in the first set of bit values, based on the first particular bit value;

determine a first bit value, included in the first set of bit values, based on subtracting a value from the in-phase x-pol component included in the group of symbol values;

determine a second bit value, included in the first set of bit values, based on subtracting the value from the quadrature x-pol component included in the group of symbol values;

determine a third bit value, included in the first set of bit values, based on subtracting the value from the in-phase y-pol component included in the group of symbol values;

determine a fourth bit value, included in the first set of bit values, based on subtracting the value from the quadrature y-pol component included in the group of symbol values; and where the DSP, when determining the first set of bit values, is further configured to:

determine the first set of bit values based on the first bit value, the second bit value, the third bit value, the fourth bit value, and the fifth bit value.

10. The optical system of claim 7, where the DSP is further configured to:

identify an in-phase x-pol component of the 5QAM signal;
identify a quadrature x-pol component of the 5QAM signal;
identify an in-phase y-pol component of the 5QAM signal;
identify a quadrature y-pol component of the 5QAM signal;

determine a fifth bit value, included in the second set of bit values, based on the second particular bit value;

determine a first bit value, included in the second set of bit values, based on adding a value to the in-phase x-pol component included in the group of symbol values;

determine a second bit value, included in the second set of bit values, based on adding the value to the quadrature x-pol component included in the group of symbol values;

determine a third bit value, included in the second set of bit values, based on adding the value to the in-phase y-pol component included in the group of symbol values;

determine a fourth bit value, included in the second set of bit values, based on adding the value to the quadrature y-pol component included in the group of symbol values; and where the DSP, when determining the second set of bit values, is further configured to:

determine the second set of bit values based on the first bit value, the second bit value, the third bit value, the fourth bit value, and the fifth bit value.

11. The optical system of claim 7, where the DSP, when computing the first distance, is further configured to:

determine a first Euclidean distance based on the group of symbol values and the first set of bit values; and where the DSP, when computing the second distance, is further configured to:

determine a second Euclidean distance based on the group of symbol values and the second set of bit values.

12. The optical system of claim 7, where the DSP is configured to:

decode the 5QAM signal using less than approximately 0.5 million gates.

13. The optical system of claim 7, where the DSP is further configured to:

determine a 5-bit word associated with the correct set of decoded bit values; and where the DSP, when providing the output associated with the correct set of decoded bit values, is further configured to:

provide the 5-bit word.

14. A method, comprising:

identifying, by a digital signal processor (DSP), symbol values included in a 5 quadrature amplitude modulation (5QAM) signal;

determining, by the DSP, a first bit set based on the symbol values and a first particular bit value included in the first bit set;

determining, by the DSP, a second bit set based on the symbol values and a second particular bit value included in the second bit set, the second particular bit value being different than the first particular bit value;

computing, by the DSP, a first distance based on the first bit set and the symbol values, the first distance being a representation of a distance between a first set of possible symbol values and the symbol values, the first set of possible symbol values corresponding to the first bit set;

computing, by the DSP, a second distance based on the second bit set and the symbol values, the second distance being a representation of a distance between a second set of possible symbol values and the symbol values, the second set of possible symbol values corresponding to the second bit set;

identifying, by the DSP, a minimum distance of the first distance and the second distance, the minimum distance indicating that the first bit set or the second bit set, associated with the minimum distance, is a correctly decoded bit set; and providing, by the DSP, an output associated with the correctly decoded bit set.

15. The method of claim 14, further comprising:

identifying an in-phase x-pol component of the 5QAM signal;
identifying a quadrature x-pol component of the 5QAM signal;
identifying an in-phase y-pol component of the 5QAM signal;
identifying a quadrature y-pol component of the 5QAM signal; and where identifying the symbol values further comprises:

identifying the symbol values based on the in-phase x-pol component, the quadrature x-pol component, the in-phase y-pol component, and the quadrature y-pol component.

16. The method of claim 14, further comprising:

identifying an in-phase x-pol component of the 5QAM signal;
identifying a quadrature x-pol component of the 5QAM signal;
identifying an in-phase y-pol component of the 5QAM signal;
identifying a quadrature y-pol component of the 5QAM signal;

determining a fifth bit value, included in the first bit set, based on the first particular bit value;

determining a first bit value, included in the first bit set, based on subtracting a value from the in-phase x-pol component included in the symbol values;

determining a second bit value, included in the first bit set, based on subtracting the value from the quadrature x-pol component included in the symbol values;

determining a third bit value, included in the first bit set, based on subtracting the value from the in-phase y-pol component included in the symbol values;

determining a fourth bit value, included in the first bit set, based on subtracting the value from the quadrature y-pol component included in the symbol values; and where determining the first bit set further comprises:
determining the first bit set based on the first bit value, the second bit value, the third bit value, the fourth bit value, and the fifth bit value.

17. The method of claim 16, further comprising:
identifying an in-phase x-pol component of the 5QAM signal;
identifying a quadrature x-pol component of the 5QAM signal;
identifying an in-phase y-pol component of the 5QAM signal;
identifying a quadrature y-pol component of the 5QAM signal;
determining a fifth bit value, included in the second bit set, based on the second particular bit value;
determining a first bit value, included in the second bit set, based on adding a value to the in-phase x-pol component included in the symbol values;

determining a second bit value, included in the second bit set, based on adding the value to the quadrature x-pol component included in the symbol values;

determining a third bit value, included in the second bit set, based on adding the value to the in-phase y-pol component included in the symbol values;

determining a fourth bit value, included in the second bit set, based on adding the value to the quadrature y-pol component included in the symbol values; and where determining the second bit set further comprises:
determining the second bit set based on the first bit value, the second bit value, the third bit value, the fourth bit value, and the fifth bit value.

18. The method of claim 14, further comprising:
comparing the first distance to the second distance; and
where determining the minimum distance further comprises:
determining the minimum distance based on comparing the first distance and the second distance.

19. The method of claim 14, further comprising:
determining a 5-bit word associated with the correctly decoded bit set; and
where providing the output associated with the correctly decoded bit set further comprises:
providing the 5-bit word.

* * * * *